United States Patent
Choc et al.

(10) Patent No.: US 9,588,636 B1
(45) Date of Patent: Mar. 7, 2017

(54) EXIT FULL SCREEN MODE OF A WEB BROWSER ON CONTENT-BASED EVENT

(71) Applicant: Google Inc., Mountain View, CA (US)

(72) Inventors: Theodore Nicholas Choc, Menlo Park, CA (US); Stuart Bruce Morgan, San Francisco, CA (US); John François Julien Mellor, London (GB); Christopher Reid Palmer, San Francisco, CA (US); Eric Alain Dominique Noyau, Samois sur Seine (FR)

(73) Assignee: Google Inc., Mountain View, CA (US)

( * ) Notice: Subject to any disclaimer, the term of this patent is extended or adjusted under 35 U.S.C. 154(b) by 467 days.

(21) Appl. No.: 14/109,742

(22) Filed: Dec. 17, 2013

(51) Int. Cl.
*G06F 3/0481* (2013.01)

(52) U.S. Cl.
CPC .................................. *G06F 3/0481* (2013.01)

(58) Field of Classification Search
CPC ...................................................... G06F 3/0481
See application file for complete search history.

(56) References Cited

U.S. PATENT DOCUMENTS

| | | | | |
|---|---|---|---|---|
| 7,660,416 B1* | 2/2010 | Kline | ..................... | G06Q 10/10 380/216 |
| 8,775,965 B1* | 7/2014 | Kuscher | ................. | G06F 3/0481 707/E17.107 |
| 2007/0016867 A1* | 1/2007 | Nickell | ................. | G06F 9/4443 715/730 |
| 2009/0132808 A1* | 5/2009 | Baentsch | ............ | H04L 63/0471 713/152 |
| 2010/0114857 A1* | 5/2010 | Edwards | ........... | G06F 17/30817 707/709 |
| 2011/0113363 A1* | 5/2011 | Hunt | ..................... | G06F 3/0481 715/800 |
| 2012/0088217 A1* | 4/2012 | Freeman | .................. | G09B 7/00 434/350 |
| 2013/0021379 A1* | 1/2013 | Sirpal | .................... | G06F 1/1616 345/659 |
| 2013/0073932 A1* | 3/2013 | Migos | ................. | G06F 15/0291 715/201 |
| 2013/0122980 A1* | 5/2013 | Lachina | .................... | G09B 5/00 463/9 |
| 2013/0135221 A1* | 5/2013 | Ainslie | ................... | G06F 3/038 345/173 |

(Continued)

OTHER PUBLICATIONS

Tweaking with Vishal, "How to Disable Toolbar Auto-hide Feature in Full Screen Mode of Mozilla Firefox," ("Vishal") published on Sep. 15, 2011, as retrieved from the online Internet Archive, <URL=https://web.archive.org/web/20110915025051/http://www.askvg.com/howtodisabletoolbarautohidefeatureinful-lscreenmodeofmo zillafirefox/>.*

(Continued)

*Primary Examiner* — Linh K Pham
*Assistant Examiner* — James T Tsai
(74) *Attorney, Agent, or Firm* — McDermott Will & Emery LLP

(57) ABSTRACT

Aspects of the subject technology relate to exiting a full screen mode of a web browser. A system is configured to provide for display on a screen a web page in a full screen mode of a web browser. The system is further configured to detect a content-based event in the web browser and, in response to the detection, exit the full screen mode of the web browser.

20 Claims, 10 Drawing Sheets

(56) References Cited

U.S. PATENT DOCUMENTS

| | | | | |
|---|---|---|---|---|
| 2013/0325343 | A1* | 12/2013 | Blumenberg | G01C 21/00 |
| | | | | 701/533 |
| 2014/0053071 | A1* | 2/2014 | Penner | G06Q 10/10 |
| | | | | 715/732 |
| 2014/0136933 | A1* | 5/2014 | Berger | G06Q 10/10 |
| | | | | 715/202 |
| 2016/0027231 | A1* | 1/2016 | Guzzone | G07F 9/006 |
| | | | | 705/16 |

OTHER PUBLICATIONS

Google Chrome Help Forum, Yoshua, "How about adding a URL bar in full screen mode?" ("Yoshua") published on May 17, 200, <URL=https://productforums.google.com/forum/#!topic/chrome/oXnR6AgtzYo 1/>.*

Microsoft Developer Network, "Fullscreen API," <URL=https://msdn.microsoft.com/en-us/library/dn265028(d=printer,v=vs.85).aspx>, Nov. 5, 2012.*

* cited by examiner

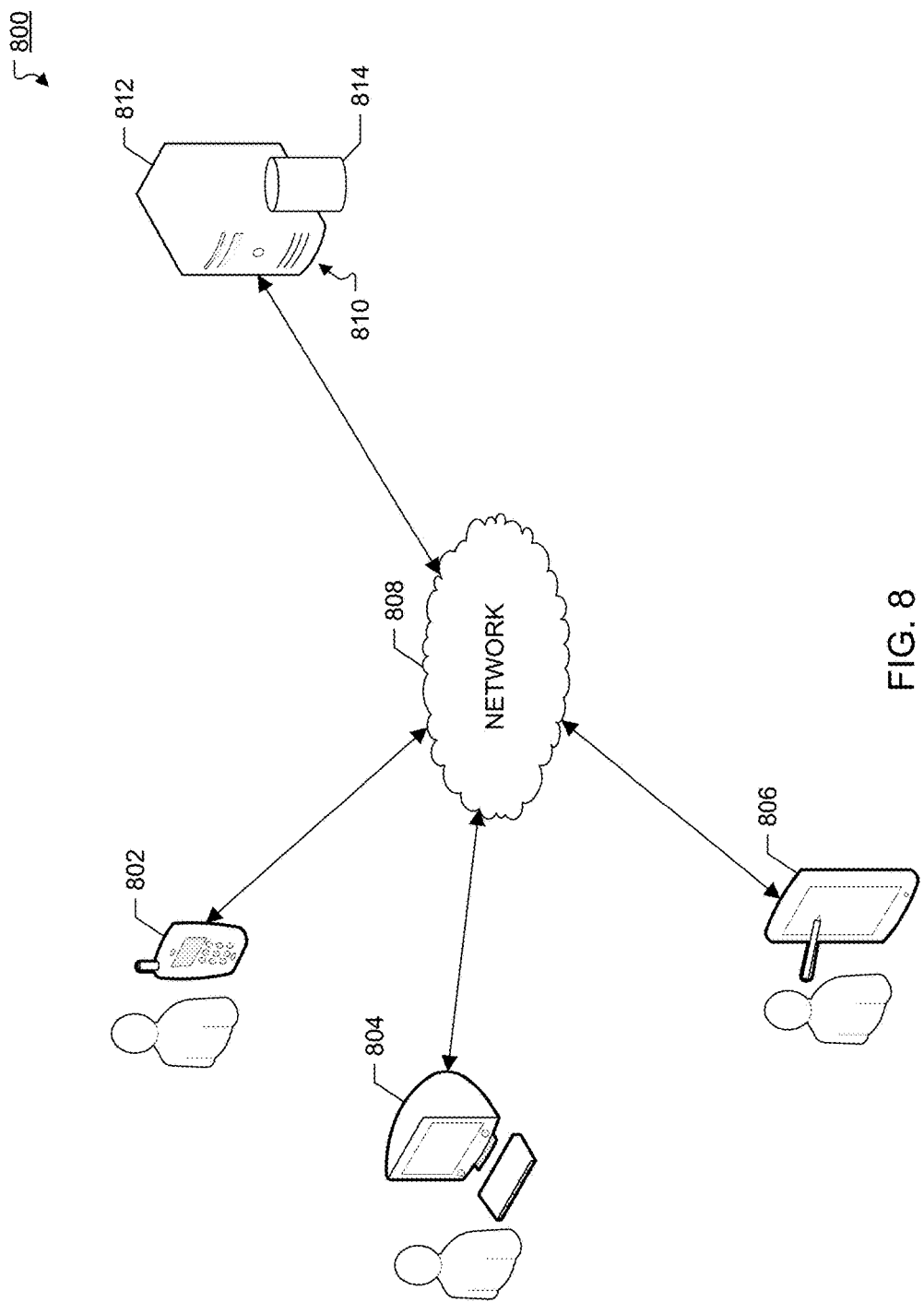

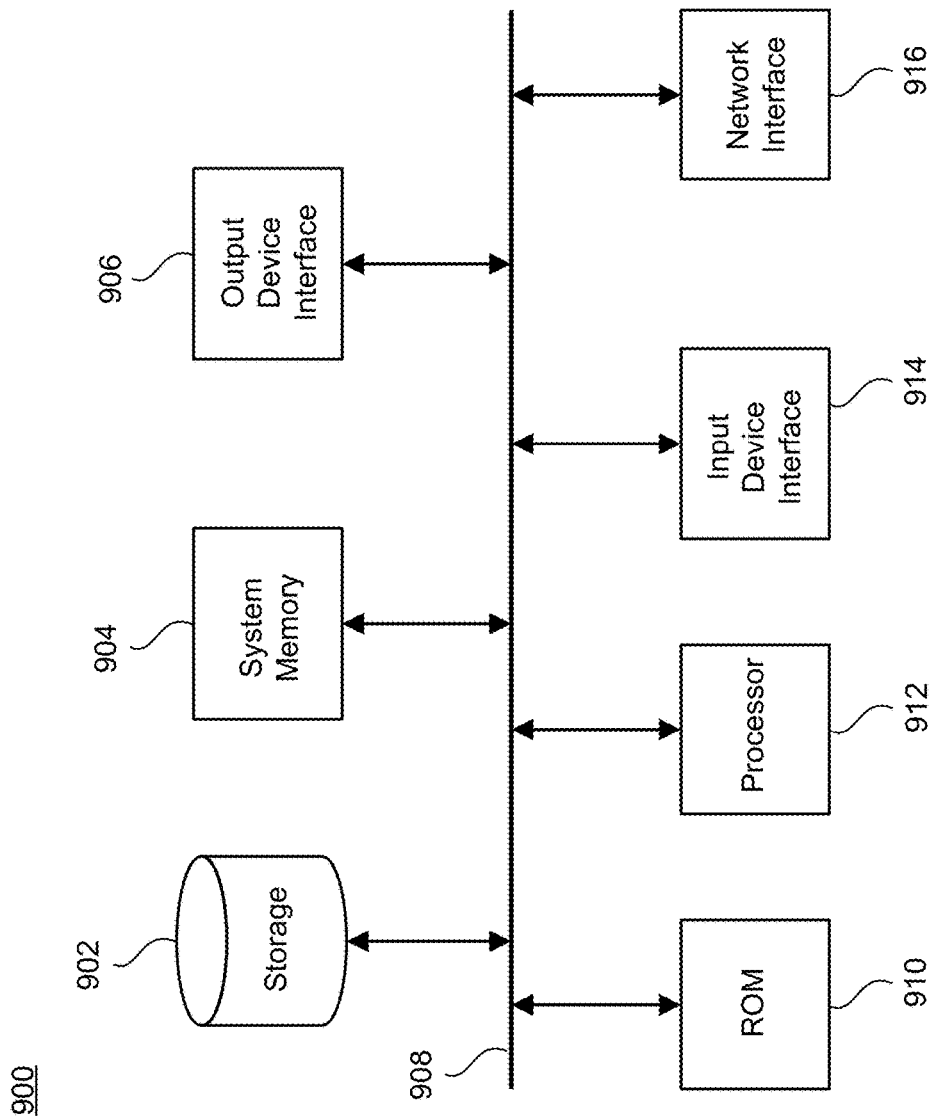

EXIT FULL SCREEN MODE OF A WEB BROWSER ON CONTENT-BASED EVENT

BACKGROUND

The present disclosure generally relates to web browsers, and in particular, to exiting a full screen mode of a web browser in response to a content-based event.

Applications can be utilized to display a web page with content to be loaded from one or more sources. Space on a screen or on an application interface may be at a premium, such as in mobile devices for example. When displaying a web page, some of the screen is utilized to display interface elements such as an address bar or a toolbar and not the web page itself.

By executing a web browser in a full screen mode, some or all of the interface elements, aside from a display area of a web browser interface that is configured to display the web page, can be hidden (e.g., not visible on the screen). The additional space on the screen can be configured for the display area and, accordingly, for display of the web page itself. However, in hiding the interface elements, information that might be useful to a user, such as a uniform resource locator of the web page, is not visible on the screen to the user.

SUMMARY

Aspects of the subject technology relate to a computer-implemented method for exiting a full screen mode of a web browser. The method includes displaying a web page in a full screen mode of a web browser. The method further includes detecting a content-based event in the web browser. In response to detecting the content-based event, the method further includes exiting the full screen mode of the web browser.

Aspects of the subject technology also relate to a system for exiting a full screen mode of a web browser. The system includes one or more processors and a non-transitory computer-readable medium including instructions stored therein, which when executed by the one or more processors, cause the one or more processors to perform operations. The operations include providing for display a web page in a full screen mode of a web browser, where an address bar configured to display a universal resource locator of the web page is hidden when the web browser is in the full screen mode. The operations further include detecting a content-based event in the web browser and, in response to detecting the content-based event, exiting the full screen mode of the web browser, where the exiting of the full screen mode includes displaying the address bar.

Aspects of the subject technology also relate to a non-transitory machine-readable medium including instructions stored therein, which when executed by a machine, cause the machine to perform operations for exiting a full screen mode of a web browser. The operations include detecting a predefined action in a web browser, displaying a web page in a full screen mode of the web browser in response to detecting the predefined action, detecting a content-based event in the web browser, and, in response to detecting the content-based event, exiting the full screen mode of the web browser.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

FIG. 8 illustrates an example network environment in which web pages can be provided to web browsers.

FIG. 9 conceptually illustrates an example electronic system with which some implementations of the subject technology can be implemented.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Figure 1:
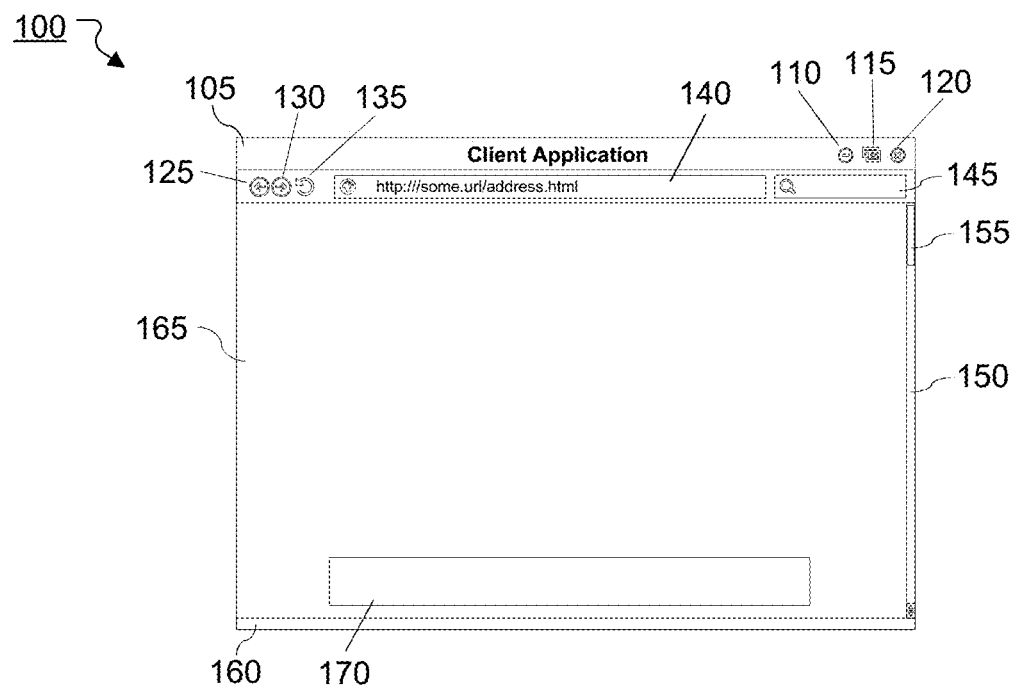
FIG. 1 illustrates an example web browser interface in which a web page is displayed on a screen of a client device.

FIG. 1 illustrates an example web browser interface 100 in which a web page is displayed on a screen of a client device. Specifically, FIG. 1 illustrates an example web browser interface 100, as displayed on the screen of the client device, when a web browser is executed in a standard mode (e.g., out of a full screen mode). The web browser can be run on the client device (e.g., computing device such as a computer, touch-screen phone, and so forth) being used by a user, and the web browser interface 100 is being displayed on the screen (e.g., monitor) of the client device. The web browser interface 100 includes interface elements that perform actions when interacted with or executed by the user of the web browser.

The interface elements include an address bar 140, which is configured to show a universal resource locator (URL) of the web page and is configured to accept a URL from the user. The interface elements also include a display area 165. The web page is displayed in the display area 165 of the web browser interface 100. The display area 165 of FIG. 1 shows a text input box 170. The interface elements also include a vertical scroll bar 150 and associated slider 155. Position of the slider 155 indicates which portion of the web page is being displayed in the display area 165. A user can scroll up and down the web page via such actions as a touch-input, a gesture, a mouse input, and so forth.

The interface elements also include a title bar 105, which can be configured to display a title associated with the web page. The interface elements also include a status bar 160, which can be configured to display information pertaining to the web page, information pertaining to downloading of the web page, and so forth. For example, the status bar 160 can display an indication of what percentage of the web page has been downloaded, an indication that the web page has been completely downloaded, and/or a result of a security authentication of the web page.

The interface elements also include a search bar 145, which can be configured to accept search terms into a search engine. The interface elements also include buttons for navigating away from the web page or reloading the web page, such as a back button 125 for navigating to a previous URL, if applicable; a forward button 130 for navigating to a next URL, if applicable; and a reload button 135 for reloading the web page. The interface elements also include a minimize button 110 for minimizing the web browser interface 100; a maximize/resize button 115 that toggles between maximizing and resizing the web browser interface 100; and a close button 120 for closing the web browser interface 100 (e.g., closing all tabs of the web browser).

It is noted that FIG. 1 provides one example of a web browser interface and that other web browser interfaces can be utilized in accordance with one or more implementations of the subject technology. For example, in one or more implementations, the web browser interface can include an omnibox bar that includes functionality of the address bar 140 and the search bar 145. In such cases, one or more of the address bar 140 and the search bar 145 might or might not be removed from the web browser interface. In one or more implementations, the web browser interface 100 can further include a horizontal scroll bar and/or a slider (e.g., when the web page extends wider than the display area 165 along a horizontal position).

Furthermore, fewer or more interface elements can be included in a web browser interface. Other interface elements can also be provided to the user, including additional address bars (e.g., location bar, omnibox bar, and so forth), toolbars, title bars, tabs, or other textual and graphical elements. Functionality of any interface element described above may be merged with another interface element, split into additional interface elements, removed altogether, and so forth. In one or more implementations, the web browser interface may be configured to display a particular set of interface elements based on settings provided by the web browser itself (e.g., default settings), a user of the web browser, another application or an operating system within which the web browser is run, or a combination thereof. Functionality of the interface elements can be similarly provided.

FIGS. 2A-2D illustrate examples of a web browser interface, as displayed on a screen of a client device, when a web browser is executed in a full screen mode. Specifically, each of FIGS. 2A-2D illustrates the web browser interface 100 of FIG. 1 when executed in a full screen mode. As previously indicated, a web page that is running in a web browser can be displayed on a screen of a client device in a full screen mode. In one or more implementations, executing the web browser in a full screen mode allows for more real estate of the screen of the client device (e.g., mobile device) to be utilized for displaying the web page.

Figure 2A:
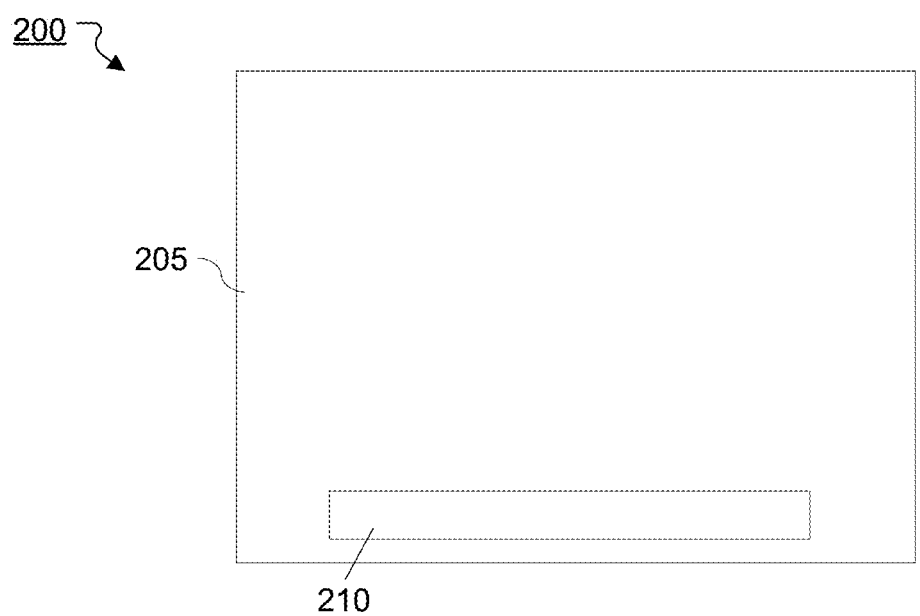
FIGS. 2A-2D illustrate examples of a web browser interface, as displayed on a screen of a client device, when a web browser is executed in a full screen mode.

FIG. 2A illustrates an example of a web browser interface 200, as displayed on the screen of the client device, when the web browser is executed in a full screen mode. The web browser interface 200 includes a display area 205. The display area 205 shows a text input box 210. Various interface elements (e.g., 105, 110, among others) shown in the web browser interface 100 of FIG. 1 are hidden in the web browser interface 200 of FIG. 2A. Accordingly, more real estate of the screen of the client device (e.g., real estate of the screen previously used to display the various interface elements) is utilized for the display area 205, as shown in FIG. 2A relative to FIG. 1.

Figure 2B:
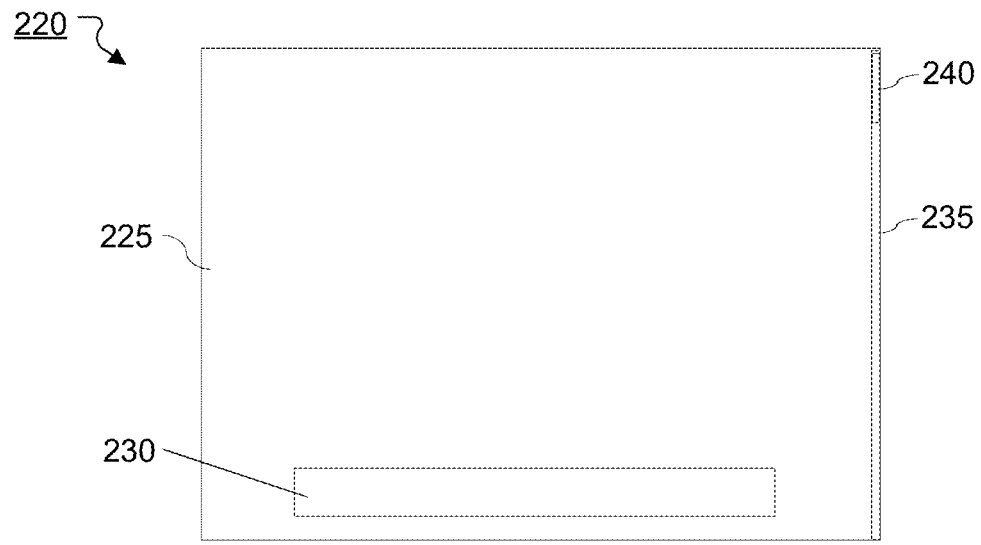

FIG. 2B illustrates an example of a web browser interface 220, as displayed on the screen of the client device, when the web browser is executed in a full screen mode. The web browser interface 220 includes a display area 225. The display area 225 shows a text input box 230. The web browser interface 220 also includes a vertical scroll bar 235 and associated slider 240. Similar to FIG. 2A, various interface elements (e.g., 105, 110, among others) shown in the web browser interface 100 of FIG. 1 are hidden in the web browser interface 220 of FIG. 2B.

Figure 2C:
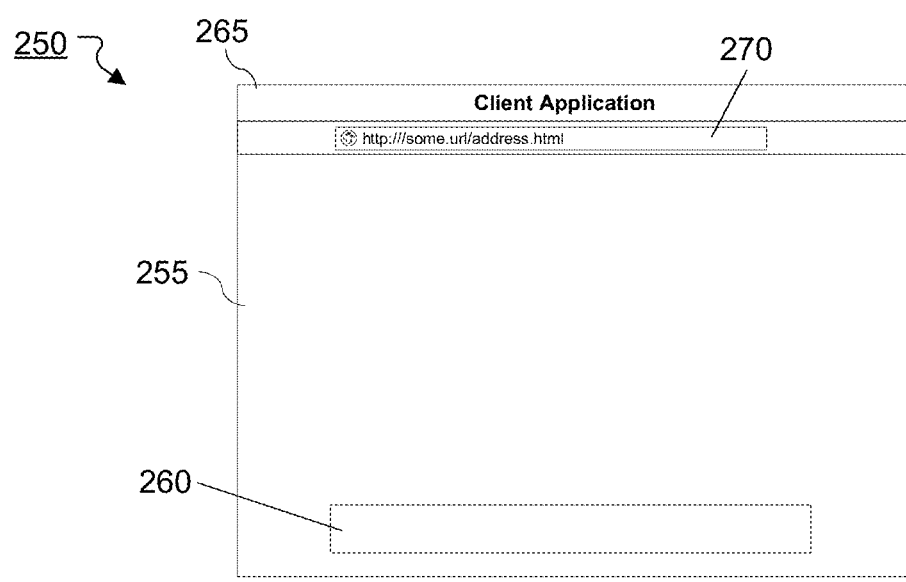

FIG. 2C illustrates an example of a web browser interface 250, as displayed on the screen of the client device, when the web browser is executed in a full screen mode. The web browser interface 250 includes a display area 255. The display area 255 shows a text input box 260. The web browser interface 250 also includes a title bar 265 and an address bar 270. Similar to FIGS. 2A and 2B, various interface elements (e.g., 110, among others) shown in the web browser interface 100 of FIG. 1 are hidden in the web browser interface 250 of FIG. 2C.

Figure 2D:
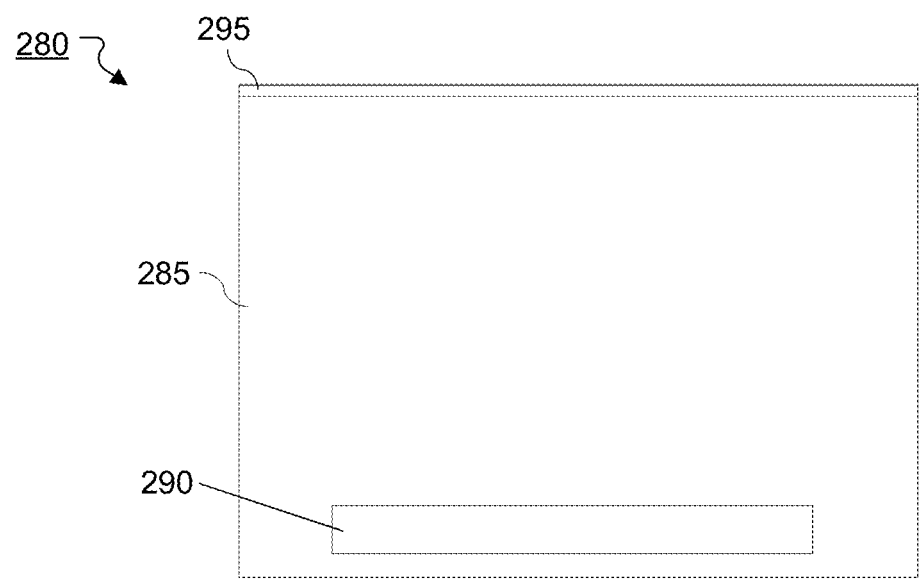

FIG. 2D illustrates an example of a web browser interface 280, as displayed on the screen of the client device, when the web browser is executed in a full screen mode. The web browser interface 280 includes a display area 285. The display area 285 shows a text input box 290. The web browser interface 280 also includes a status bar 295. Similar to FIGS. 2A-2C, various interface elements (e.g., 110, among others) shown in the web browser interface 100 of FIG. 1 are hidden in the web browser interface 280 of FIG. 2D. It is noted that, in accordance with one or more implementations, placement of the status bar 295 in the web browser interface 280 differs from placement of the status bar 160 in the web browser interface 100 of FIG. 1.

As discussed above, FIGS. 2A-2D provide examples of web browser interfaces, as displayed on the screen of the client device, when the web browser is executed in a full screen mode. In one or more implementations, some or all of the interface elements aside from the display area, such as those shown in FIG. 1, are hidden, as shown with reference to FIGS. 2A-2D. Accordingly, more real estate of the screen of the client device (e.g., real estate of the screen previously used to display the various interface elements) is utilized for the display areas (e.g., 205, 225, 255, 285) of FIGS. 2A-2D relative to the display area (e.g., 165) of FIG. 1.

The configurations above are provided by way of example and not of limitation, and other configurations are possible.

In one or more implementations, the web browser, when executed in a full screen mode, can be configured to display, in the web browser interface, interface elements different from those displayed in FIGS. 2A-2D. Additionally, more or fewer interface elements than those provided in FIGS. 2A-2D can be displayed when the web browser is executed in a full screen mode.

In one or more implementations, the full screen mode may provide a display area, within which to display the web page, such that the display area occupies an entirety of a screen of a client device. In one or more implementations, the full screen mode may provide the display area such that the display area occupies less than an entirety of the screen of the client device but more than when the web browser is not executed in the full screen mode (e.g., when executed in a standard mode).

In one or more implementations, some or all of the interface elements in the web browser interface, such as those shown in FIG. 1, are hidden. For example, the full screen mode can be configured to provide the display area such that the display area occupies an entirety of the screen of the client device except for certain predetermined interface elements of the web browser (e.g., location bar(s), status bar(s), task bar(s), and so forth) and/or predetermined areas. In one or more implementations, the web browser interface, when the web browser is executed in a full screen mode, may be configured to display a particular set of interface elements based on settings provided by the web browser itself (e.g., default settings), a user of the web browser, another application or an operating system within which the web browser is run, or a combination thereof.

It is noted that in each of FIG. 1 and FIGS. 2A-2D, for illustration purposes, the web browser interface is illustrated as being displayed in a maximized view window that covers an entirety of the screen of the client device. However, in one or more implementations, the web browser interface in both standard mode and full screen mode may be configured to cover less than the entirety of the screen of the client device. In one or more implementations, the standard mode may be configured to cover less than the entirety of the screen of the client device or may be configured to cover the entirety of the screen of the client device whereas the full screen mode is configured to cover the entirety of the screen of the client device. Other configurations are possible, and the subject technology is not limited to the specific details set forth above.

A full screen mode of a web browser can be executed when, for example, a user of the web browser selects an option provided by the web browser, presses a key or sequence of keys on a keyboard, or performs a predefined action, among others, in order to execute the web browser in the full screen mode. A predefined action may occur, for example, when the user scrolls down a web page (e.g., via touch-input or a gesture, mouse input, and so forth). In some configurations, a threshold for when the web browser enters into the full screen mode may be triggered by detecting whether the user scrolls or gestures beyond a predetermined amount or percentage of a height of the web page. The web page may have dimensions expressed in a number of pixels representing a width and a height of the web page.

As previously indicated, displaying content in a full screen mode of a web browser might not be desirable. As described with reference to FIGS. 2A-2D, some or all interface elements provided on a web browser interface when the web browser is out of the full screen mode are hidden when the web browser is in a full screen mode. Displaying content in the full screen mode might cause a user of the web browser to be more susceptible to security vulnerabilities since interface elements that may communicate security relevant information are not displayed. An address bar may be hidden in the full screen mode, for example, and the user may be more susceptible to entering sensitive information on an incorrect web page or an imposter web page than in a case when the address bar is not hidden. In one example, the imposter web page may imitate another web page by copying presentation of the other web page. Upon exiting the full screen mode, the address bar and/or other textual and graphical interface elements previously hidden during the full screen mode are placed back for display on the screen of the client device such that the user may inspect these elements.

In accordance with aspects of the subject technology, methods and systems are provided for exiting a full screen mode of a web browser in response to detecting a content-based event in the web browser. Once the full screen mode is exited, the web browser may remain out of the full screen mode until the full screen mode is executed again (e.g., user selects an option provided by the web browser, presses a key or sequence of keys on a keyboard, or performs a predefined action).

As used herein, the term "content-based event" refers to activity associated with content of a web page being processed and displayed by a web browser that triggers an exit from a full screen mode of a web browser. The activity may be initiated by user interaction with content of the web page being displayed by the web browser, such as selecting a link displayed in the web page to navigate to a new web page or inputting text into a text input element displayed in the web page, for example. The activity also may be initiated by the web browser processing content in the web page, such as validating a certificate received in connection with the web page or displaying a pop-up window triggered by a running script from the web page, for example. Other examples of content-based events are provided below.

In connection with the subject technology, content-based events do not include activity associated with browser control elements primarily designated for control of a full screen mode in a web browser. Such browser control elements may include user interface buttons and/or menu items configured to toggle the full screen mode of the web browser upon selection by a user, for example.

Figure 3:
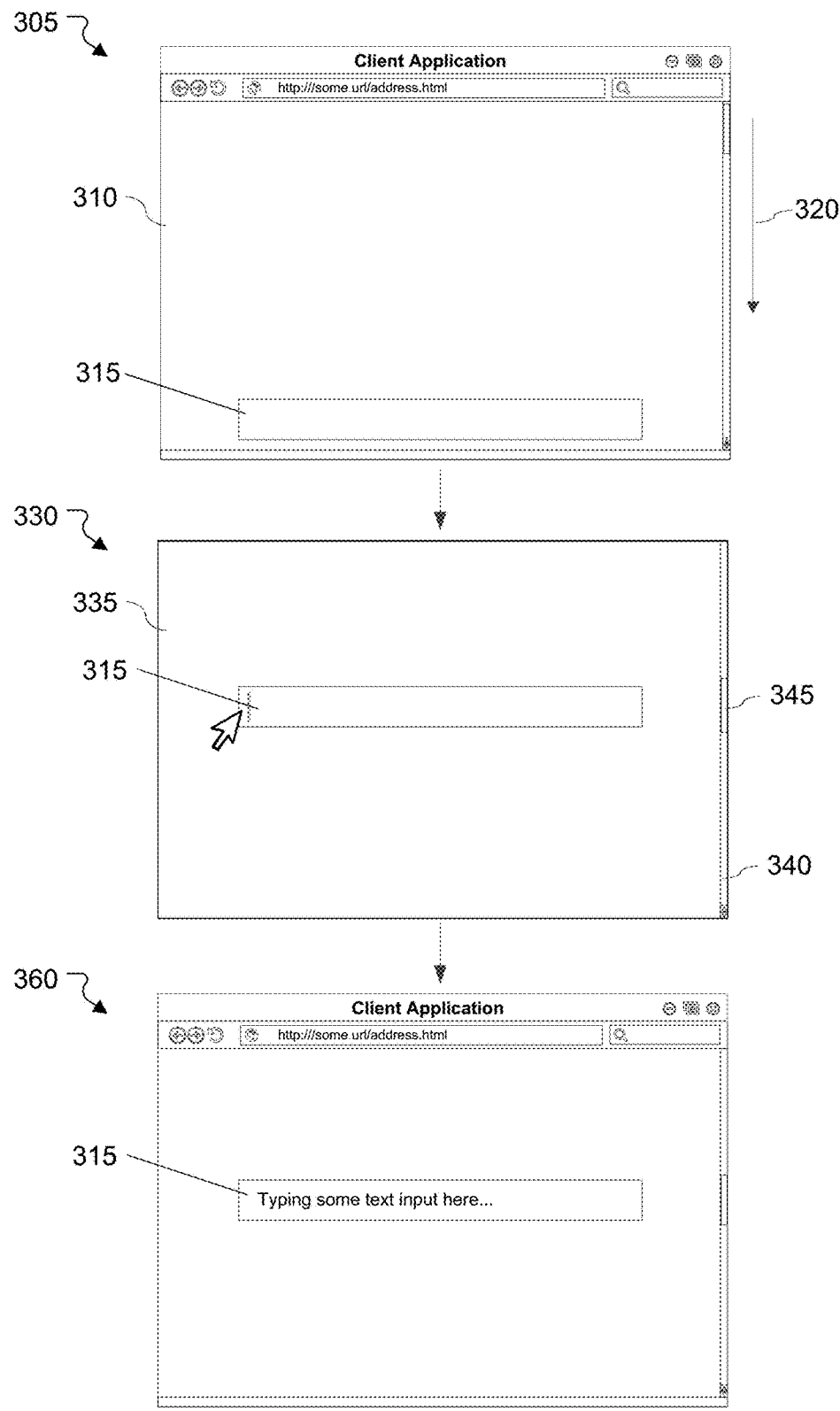
FIG. 3 shows a sequence of web browser interfaces, as displayed on a screen of a client device, that illustrates an example of a web browser exiting a full screen mode in response to detection of a content-based event, in accordance with various aspects of the subject technology.
Figure 4:
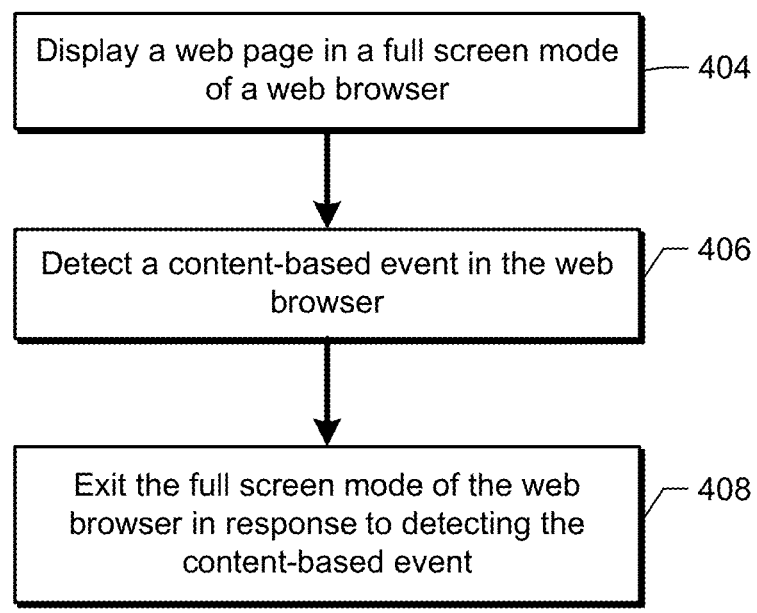
FIG. 4 shows a flowchart illustrating an example process for exiting a web browser from a full screen mode, in accordance with various aspects of the subject technology.

FIG. 3 shows a sequence of web browser interfaces 305, 330, and 360, as displayed on a screen of a client device, that illustrates an example of a web browser exiting a full screen mode in response to detection of a content-based event, in accordance with various aspects of the subject technology. FIG. 3 will be discussed with reference to FIG. 4. FIG. 4 shows a flowchart illustrating an example process 400 for exiting a web browser from a full screen mode, in accordance with various aspects of the subject technology.

The web browser interface 305 is associated with the web browser executed in a standard mode. The web browser interface 305 includes many of the same interface elements as those shown in the web browser interface 100 of FIG. 1. Among other interface elements, the web browser interface 305 includes a display area 310 within which the web page is displayed. The web page includes a text input box 315.

Consider that a user of the web browser performs a downward scrolling motion 320. The display on the screen on the client device changes from the web browser interface 305 to the web browser interface 330 in response to the download scrolling motion 320. Specifically, the web browser displaying the web page in the display area 310 is executed in a full screen mode based on the user's scrolling down the web page, which causes the various interface elements (e.g., title bar, address bar, etc.) to be hidden. As shown in web browser interface 330, the web page is displayed in the full screen mode of the web browser, as set forth in step 404 of FIG. 4.

The web browser interface 330 is associated with the web browser executed in a full screen mode. The web browser interface 330 includes a vertical scroll bar 340 and associated slider 345. The web browser interface 330 also includes a display area 335, within which the web page is displayed. The web page includes the text input box 315.

Consider that the user of the web browser interacts with the text input box 315 in the web page by selecting the text input box 315 and inputting text into the text input box 315. Upon detection of the user inputting text (e.g., the first letter input by the user), the display on the screen on the client device changes from the web browser interface 330 to the web browser interface 360. Specifically, the web browser exits the full screen mode and makes visible the various interface elements. Accordingly, the web browser interface 360 places back for display the interface elements previously hidden in the web browser interface 330. As shown in the web browser interface 360, the web browser exits the full screen mode and re-enters the standard mode.

In such a case, the content-based event is the user-initiated event of the user inputting text into the text input box 315. The content-based event is detected in the web browser, as set forth in step 406 of FIG. 4. In one or more implementations, the web browser receives an input associated with the user inputting text on the web page. The input can be a signal to the web browser indicating that a user has input text into the text input box 315 or the input can be the actual text input provided by the user in the text input box 315. The web browser exits the full screen mode in response to the detection of the content-based event, as set forth in step 408 of FIG. 4. In one or more implementations, the web browser returns to the standard mode when the web browser exits the full screen mode.

As previously indicated, the text input box 315 in the web page might be asking for information possibly sensitive to a user such as a password or financial information. By exiting the full screen mode, the web browser makes the address bar, among other interface elements, visible to the user, and therefore makes it more likely for the URL associated with the web page to be noticed or checked by the user. As shown with reference to FIG. 3, the inputting of text in the text input box 315 is considered a content-based event that, when detected, causes the web browser to exit the full screen mode. In one or more implementations, the selecting of the text input box 315 may be considered a content-based event that, when detected, causes the web browser to exit the full screen mode.

As previously described above with reference to FIG. 3, FIG. 4 shows a flowchart illustrating an example process 400 for exiting a web browser from a full screen mode, in accordance with various aspects of the subject technology. At step 404, a web page is displayed in a full screen mode of the web browser. The web browser may be displayed in a full screen mode by an explicit user instruction (e.g., pressing a key to enter a full screen mode) or due to a predefined action (e.g., scrolling down a web page). At step 406, a content-based event is detected in the web browser. In some configurations, the detection of a content-based event is performed by the web browser. At step 408, the web browser exits the full screen mode in response to the detection of the content-based event. Upon exiting the full screen mode, the address bar and/or other textual and graphical elements previously removed from display during the full screen mode are placed back for display so that the user may inspect these elements.

Figure 5:
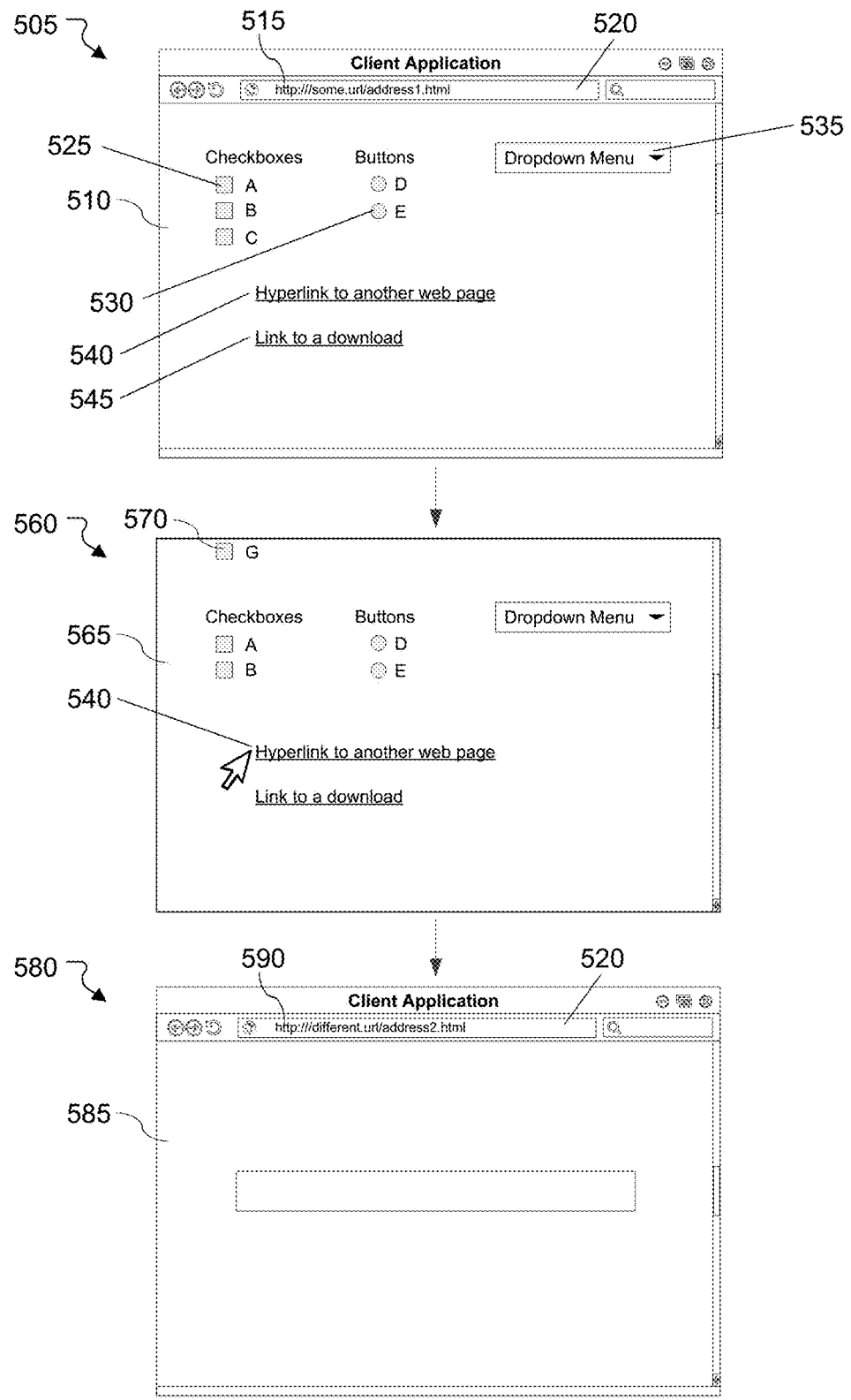
FIGS. 5-7 show additional sequences of web browser interfaces, as displayed on a screen of a client device, that illustrate additional examples of a web browser exiting a full screen mode in response to detection of a content-based event, in accordance with various aspects of the subject technology.

FIG. 5 shows additional sequences of web browser interfaces 505, 560, and 580, as displayed on a screen of a client device, that illustrate additional examples of a web browser exiting a full screen mode in response to detection of a content-based event, in accordance with various aspects of the subject technology.

In FIG. 5, the web browser interface 505 is associated with the web browser executed in a standard mode. The web browser interface 505 includes, among other interface elements, a display area 510 within which the web page is displayed. The web page has a first URL 515, as displayed in an address bar 520. The web page includes form elements including checkboxes (e.g., 525), buttons (e.g., 530), and a dropdown menu 535. The web page also includes a hyperlink 540 to another web page and a link 545 to a download.

Consider that the user performs a predefined action that causes the web browser to execute in a full screen mode, as shown with reference to the web browser interface 560. The web browser interface 560 is associated with the web browser executed in a full screen mode. The web browser interface 560 includes a display area 565 within which the web page is displayed. The web page includes those elements shown in the web browser interface 505, and an additional element 570 previously hidden by some interface elements (e.g., the address bar 520) in the web browser interface 505.

Consider that the user of the web browser clicks the hyperlink 540 while the web browser is in the full screen mode to get to a new web page. Upon detection of the clicking of the hyperlink 540, the display on the screen of the client device changes from the web browser interface 560 to the web browser interface 580. Specifically, in this example, the clicking of the hyperlink 540 is considered a content-based event that is initiated by the user, and the detection of the clicking of the hyperlink 540 causes the web browser to exit the full screen mode.

Accordingly, the web browser interface 580 places back for display the interface elements previously hidden in the web browser interface 560. As shown in the web browser interface 580, the web browser exits the full screen mode and re-enters the standard mode. The web browser interface 580 includes a display area 585 and the address bar 520, which shows a second URL 590 associated with the new web page. Although the URL shown in FIG. 5 is the second URL 590 based on the user's clicking of the hyperlink, it is noted that the web browser can exit the full screen mode before a new web page is loaded and thus display the URL of the present web page prior to navigation to the new web page.

Figure 6:
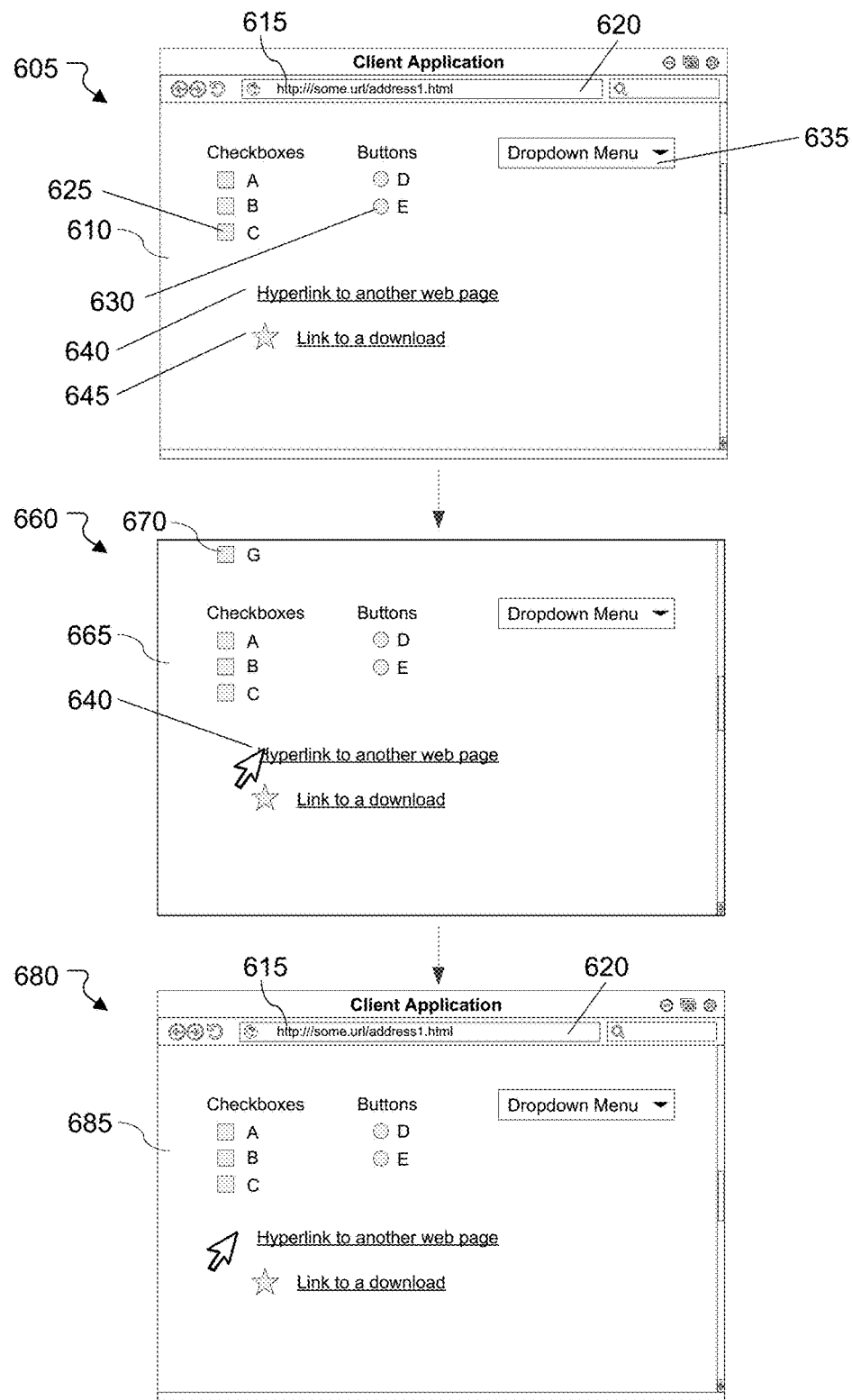

FIG. 6 shows additional sequences of web browser interfaces 605, 660, and 680, as displayed on a screen of a client device, that illustrate additional examples of a web browser exiting a full screen mode in response to detection of a content-based event, in accordance with various aspects of the subject technology.

In FIG. 6, the web browser interface 605 is associated with the web browser executed in a standard mode. The web browser interface 605 includes, among other interface elements, a display area 610 within which the web page is displayed. The web page has a URL 615, as displayed in an address bar 620. The web page includes form elements including checkboxes (e.g., 625), buttons (e.g., 630), and a dropdown menu 635. The web page also includes a hyperlink 640 to another web page and a link 645 to a download.

Consider that the user performs a predefined action that causes the web browser to execute in a full screen mode, as shown with reference to the web browser interface 660. The web browser interface 660 is associated with the web browser executed in a full screen mode. The web browser interface 660 includes a display area 665 within which the web page is displayed. The web page includes those elements shown in the web browser interface 605, and an additional element 670 previously hidden by some interface elements (e.g., the address bar 620) in the web browser interface 605.

Consider that the user of the web browser hovers over the hyperlink 640 (e.g., places/moves a mouse cursor over the hyperlink, performs a gesture over the hyperlink, etc.). Upon detection of the hovering over of the hyperlink 640, the display on the screen on the client device changes from the web browser interface 660 to the web browser interface 680. Specifically, in this example, the hovering is considered a content-based event, and the detection of the hovering causes the web browser to exit the full screen mode. Other interactions that may be performed on the hyperlink are possible and may be considered a content-based event that causes the web browser to exit the full screen mode.

Accordingly, the web browser interface 680 places back for display the interface elements previously hidden in the web browser interface 660. As shown in the web browser interface 680, the web browser exits the full screen mode and re-enters the standard mode. The web browser interface 680 includes a display area 685 and the address bar 620, which shows the URL 615. The element 670 previously shown in the web browser interface 660 is hidden by some interface elements (e.g., the address bar 620) in the web browser interface 680.

It is noted that discussion of FIGS. 5-6 is made with reference to interacting with the hyperlinks 540 and 640. The other content (e.g., 525, 530, 535, 545) shown in FIGS. 5-6, such as the checkboxes (e.g., 525), buttons (e.g., 530), dropdown menu (e.g., 535), and link to a download (e.g., 545) can also be interacted with, and such interaction may be considered a content-based event that causes the web browser to exit the full screen mode. More generally, in one or more implementations, navigation from one URL to another URL (with or without user interaction with content on the web page) may be considered a content-based event that causes the web browser to exit the full screen mode.

Figure 7:
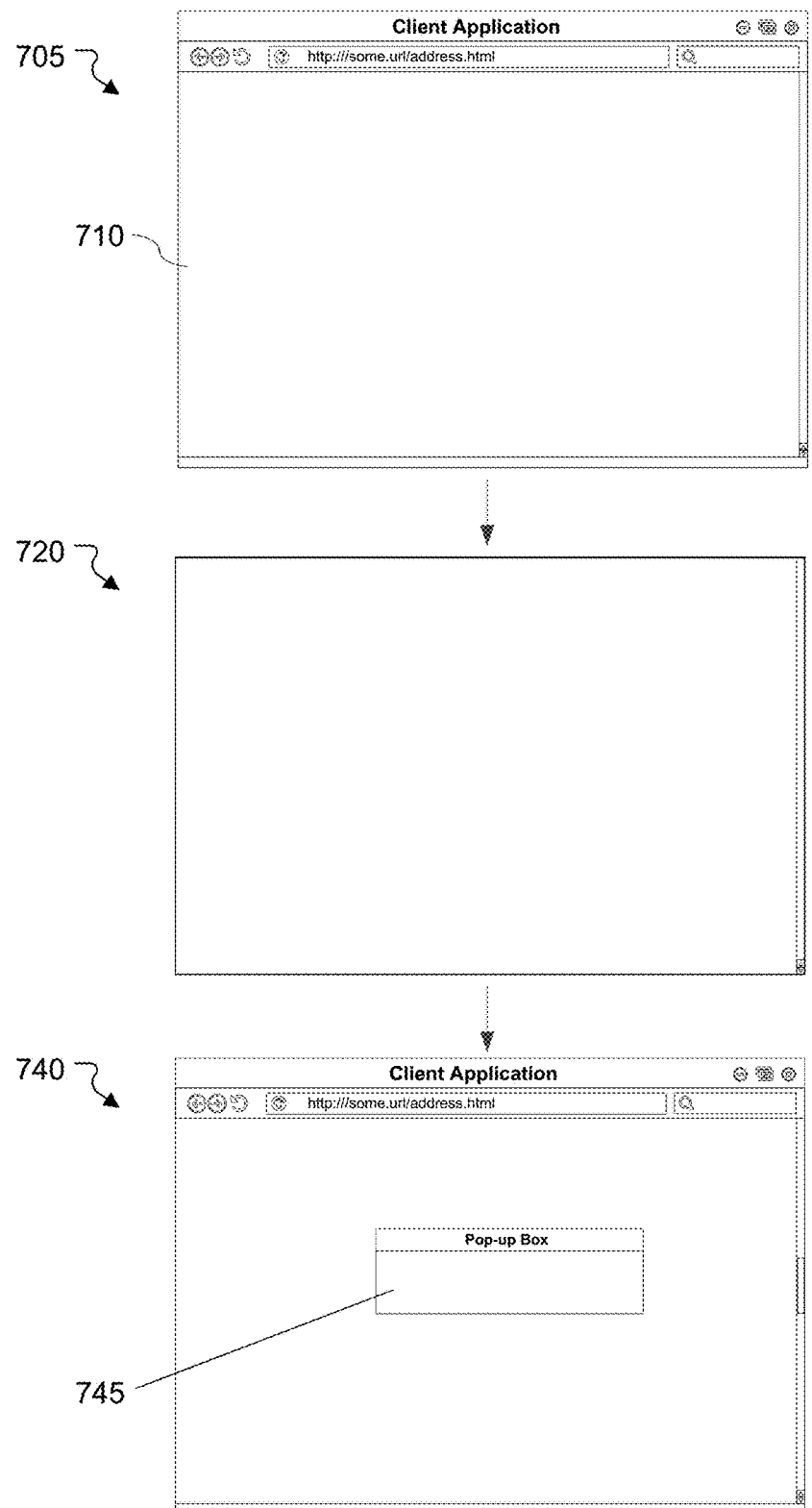

FIG. 7 shows a sequence of web browser interfaces 705, 720, 740, as displayed on a screen of a client device, that illustrates an example of a web browser exiting a full screen mode in response to detection of a content-based event, in accordance with various aspects of the subject technology. The web browser interface 705 is associated with the web browser executed in a standard mode. The web browser interface 705 includes many of the same interface elements as those shown in the web browser interface 100 of FIG. 1. Among other interface elements, the web browser interface 705 includes a display area 710 within which the web page is displayed.

Consider that the web page is being downloaded when the web browser interface 705 is being displayed, and that the user performs a predefined action that causes the web browser to execute in a full screen mode, as shown with reference to the web browser interface 720. The web browser interface 720 is associated with the web browser executed in a full screen mode. Further, consider that as the web page is being loaded, a script in the web page causes a pop-up box 745 appear in front of the view window that is displaying the web page. The pop-up box 745 appears as a different view window of the web browser than the view window that is displaying the web page. It is noted that the pop-up box 745 can also be a pop-under box that appears behind the view window of the web browser (e.g., obscured/hidden by the view window) that is displaying the web page. Upon detection of the pop-up box 745, the display on the screen on the client device changes from the web browser interface 720 to the web browser interface 740. Specifically, in this example, presence of the pop-up box 745 is a content-based event initiated by the browser through execution of the script, and the detection of the pop-up box 745 causes the web browser to exit the full screen mode.

The pop-up box 740 may be, for example, a pop-up window that loads another website or another page from the same website as the present web page (e.g., advertisement). The pop-up box may also be a dialog box (e.g., alert box, prompt box, confirm box) that prompts the user to provide input (e.g., input a username and password, confirm having seen the contents of the pop-up box, etc.). The dialog box may also be the result of detecting that a website's authentication certificate is invalid (e.g., certificate used in security protocols such as Secure Sockets Layer, Transport Layer, etc.).

The various content-based events provided above are examples, and other events may constitute a content-based event that causes a web browser executed in a full screen mode to exit from the full screen mode. For example, a user performing a free text search on the web page when the browser is in a full screen mode may cause the web browser to exit the full screen mode, where the initiation and/or inputting of the search is considered a content-based event. Interaction of a user with a form element (e.g., checkbox, buttons, and so forth) may be considered a content-based event that causes the web browser to exit the full screen mode. For example, the web browser receives a signal associated with a user input into a form element on the web page, and the signal is considered a content-based event that causes the web browser to exit the full screen mode. The signal may be an indication that the user has provided an input and/or content of the user input (e.g., an input number or string).

Commencing of a download or navigating from a first URL to a second URL may also be considered a content-based event that causes the web browser to exit the full screen mode. In some cases, the commencing of the download or the navigation from the first URL to the second URL may be user-initiated, such as by a user's clicking of a link on a web page. Alternatively, in other cases, the commencing of the download or the navigation may be browser-initiated, such as by a web browser being redirected to the second URL upon processing the web page associated with the first URL. For example, the web browser may execute a script that causes the web browser to be redirected to the second URL from the first URL.

In some configurations, as previously mentioned, the content-based event can be a result of executing a script (e.g., JavaScript) in a web page. The execution of the script can be prompted by loading a web page and/or interacting with certain elements on the web page. Additionally, the executed script may open an additional window or windows in the web browser, such as pop-up windows, dialog boxes, and so forth. The executed script may cause navigation from a current URL to a different URL or may cause initiation of a download. The opening of the windows, navigation, and download initiation by the web browser may be considered content-based events. The downloading of the script may be considered a content-based event. Other events that may result from downloading or executing of a script may also be considered a content-based event. In some configurations, the content-based event can be defined as the actual execution of script itself, regardless of results from executing the script.

As previously indicated, the subject technology may cause the web browser to exit a full screen mode upon detecting that a website's authentication certificate is invalid (e.g., certificate used in security protocols such as Secure Sockets Layer, Transport Layer, etc.). Invalidity may be determined by several mechanisms, including but not limited to, expiration of declared lifetime of the certificate, the certificate having been revoked by its issuing certification authority, the certificate having been issued by an unknown or distrusted certification authority, the certificate having been issued out of compliance with accepted industry practices, and/or upon an authentication failure from a third party certificate authority that validates certificates.

Additionally or alternatively, the subject technology may make use of other signals, such as those received from a database of known false or dangerous websites, to determine a website's veracity, and may cause the web browser to exit the full screen mode based on these external signals. These signals can be based on comparing a URL of the web page displayed on the web browser and comparing the URL to URLs in a database, where a content-based event would be a match between the URL of the web page and a URL in the database.

The configurations above are provided by way of example and not of limitation, and other configurations are possible. As described above, certain events, such as the web browser receiving user inputting text in a text input box, a user clicking on or hovering over a hyperlink, presence of a pop-up box, and so forth, can be set as content-based events that, when detected, cause a web browser to exit a full screen mode. In one or more implementations, events may be considered as content-based events based on settings provided by the web browser itself (e.g., default settings), a user of the web browser, another application or an operating system within which the web browser is run, or a combination thereof.

FIG. 8 illustrates an example network environment 800 in which web pages can be provided to web clients (e.g., web browsers). The network environment 800 includes computing devices 802, 804, and 806 (hereafter "802-806") and computing system 810. Computing devices 802-806 and computing system 810 can communicate with each other through a network 808. Computing system 810 can include one or more computing devices 812 (e.g., one or more servers) and one or more computer-readable storage devices 814 (e.g., one or more databases).

In example aspects, any of computing devices 802-806 can be utilized to run a web client (e.g., a web browser) and to display a web page in the web client. The computing device receives website data that contains data corresponding to the web page. The web page can be retrieved from local memory on computing device 802-806 or can be remotely retrieved (e.g., from the computing system 810). The web page can include web content such as text, graphics, links, scripts, and so forth. The computing device (e.g., 802-806) can display the web page in a view window of the web browser, where the web browser is, in turn, on a screen (e.g., monitor) of the computing device.

In some aspects, the computing system 810 can execute computer instructions stored in data store 814, for example, to host a website which provides a web page. A user of any of computing devices 802-806 can enter a request for the web page on the computing system 810 (e.g., a search request in a case where the computing system 810 is a search engine or a request for user profile content in the case where the computing system 810 hosts a website such as a social networking website). The computing system 810 can provide the web page to the computing device 802-806 that entered the request. The web page can be displayed on a screen (e.g., monitor) of the computing device 802-806 that receives the web page. As noted above, the web page displayed on the client device (e.g., 802-806) is not limited to those from remote website data, and can include local data, remote data, or both local and remote data.

In one or more implementations, in addition to or alternative to receiving the web page, the web browser of the computing devices 802-806 that request the web page may receive an indication related to the web page. For example, the computing devices 802-806 may receive an indication that an authentication certificate of a website associated with the web page is invalid. As another example, the computing devices 802-806 that request the web page may receive an indication that the URL of the web page matches a URL in a database that contains a list of known false or dangerous websites.

In one or more implementations, the web browser displays a web page in a full screen mode. As previously indicated, in one or more implementations, when the web browser is executed in a full screen mode, a web browser interface associated with the web browser provides a display area for displaying the web page that is larger than a display area of a standard mode (e.g., out of the full screen mode). In one or more implementations, the web browser, when executed in a full screen mode, may provide a web browser interface configured to display a particular set of interface elements based on settings provided by the web browser itself (e.g., default settings), a user of the web browser, another application or an operating system within which the web browser is run, or a combination thereof.

In one or more implementations, the web browser exits full screen mode based on detection of a content-based event that may occur while the web browser is running. The content-based events can include such events as a user inputting text in a text input box, a user executing or hovering over a hyperlink, presence of a pop-up box, and so forth. In one or more implementations, events may be considered as content-based events based on settings provided by the web browser itself (e.g., default settings), a user of the web browser, another application or an operating system within which the web browser is run, or a combination thereof.

Each of computing devices 802-806 can represent various forms of processing devices. By way of example and not of limitation, processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any of these data processing devices or other data processing devices.

Server 810 may be any system or device having a processor, a memory, and communications capability for providing content to the client devices 802-806. In some example aspects, the server 810 can be a single computing device (e.g., 812) such as, for example, a computer server.

In other embodiments, the server 810 can represent more than one computing device working together to perform the actions of a server (e.g., cloud computing, server farm). Further, the server 810 can represent various forms of servers including, but not limited to, a web server, an application server, a proxy server, a network server, or a server farm.

In some aspects, the computing devices may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS) or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 800 can be a distributed client/server system that spans one or more networks such as, for example, network 808. Network 808 can be a large computer network such as, for example, a local area network (LAN), wide area network (WAN), the Internet, a cellular network, or a combination thereof connecting any number of mobile clients, fixed clients, and servers. Further, the network 808 can include, but is not limited to, any one or more of the following network topologies, including a bus network, a star network, a ring network, a mesh network, a star-bus network, tree or hierarchical network, and the like. In some aspects, communication between each client (e.g., computing devices 802-806) and server (e.g., server 810) can occur via a virtual private network (VPN), Secure Shell (SSH) tunnel, or other secure network connection. In some aspects, network 808 may further include a corporate network (e.g., intranet) and one or more wireless access points.

FIG. 9 conceptually illustrates an example electronic system with which some implementations of the subject technology can be implemented. Electronic system 900 can be a computer, phone, PDA, or any other sort of electronic device. Such an electronic system includes various types of computer readable media and interfaces for various other types of computer readable media. Electronic system 900 includes a bus 908, processing unit(s) 912, a system memory 904, a read-only memory (ROM) 910, a permanent storage device 902, an input device interface 914, an output device interface 906, and a network interface 916.

Bus 908 collectively represents all system, peripheral, and chipset buses that communicatively connect the numerous internal devices of electronic system 900. For instance, bus 908 communicatively connects processing unit(s) 912 with ROM 910, system memory 904, and permanent storage device 902.

From these various memory units, processing unit(s) 912 retrieves instructions to execute and data to process in order to execute the processes of the subject disclosure. The processing unit(s) can be a single processor or a multi-core processor in different implementations.

ROM 910 stores static data and instructions that are needed by processing unit(s) 912 and other modules of the electronic system. Permanent storage device 902, on the other hand, is a read-and-write memory device. This device is a non-volatile memory unit that stores instructions and data even when electronic system 900 is off Some implementations of the subject disclosure use a mass-storage device (for example, a magnetic or optical disk and its corresponding disk drive) as permanent storage device 902.

Other implementations use a removable storage device (for example, a floppy disk, flash drive, and its corresponding disk drive) as permanent storage device 902. Like permanent storage device 902, system memory 904 is a read-and-write memory device. However, unlike storage device 902, system memory 904 is a volatile read-and-write memory, such as a random access memory. System memory 904 stores some of the instructions and data that the processor needs at runtime. In some implementations, the processes of the subject disclosure are stored in system memory 904, permanent storage device 902, or ROM 910. For example, the various memory units include instructions for displaying a web page in a full screen mode of a web browser, detecting a content-based event in a web browser, and exiting the full screen mode of a web browser in response to detecting a content-based event, in accordance with some implementations. From these various memory units, processing unit(s) 912 retrieves instructions to execute and data to process in order to execute the processes of some implementations.

Bus 908 also connects to input and output device interfaces 914 and 906. Input device interface 914 enables the user to communicate information and select commands to the electronic system. Input devices used with input device interface 914 include, for example, alphanumeric keyboards and pointing devices (also called "cursor control devices"). Output device interfaces 906 enables, for example, the display of images generated by the electronic system 900. Output devices used with output device interface 906 include, for example, printers and display devices, for example, cathode ray tubes (CRT) or liquid crystal displays (LCD). Some implementations include devices, for example, a touchscreen that functions as both input and output devices.

Finally, as shown in FIG. 9, bus 908 also couples electronic system 900 to a network (not shown) through a network interface 916. In this manner, the computer can be a part of a network of computers (for example, a local area network (LAN), a wide area network (WAN), or an Intranet, or a network of networks, for example, the Internet. Any or all components of electronic system 900 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method, comprising:
providing for display a web page in a full screen mode of a web browser, the web page comprises at least one form element, wherein an address bar configured to display a universal resource locator (URL) of the web page is hidden when the web browser is in the full screen mode and the address bar is displayed when the web browser is in a standard mode;
determining validity of an authentication certificate associated with the web page;
if the authentication certificate is invalid, exiting the full screen mode and displaying the web page in the standard mode of the web browser;
detecting an initial interaction associated with the at least one form element;
in response to detecting the initial interaction, exiting the full screen mode of the web browser if the web browser is in the full screen mode and displaying the web page in the standard mode of the web browser; and
receiving a subsequent interaction associated with the at least one form element in the standard mode of the web browser.

2. The method of claim 1, further comprising:
comparing a uniform resource locator (URL) of the web page to URLs in a database; and
if the web browser is in the full screen mode, exiting the full screen mode of the web browser in response to a match between the URL of the web page and one of the URLs in the database and displaying the web page in the standard mode.

3. The method of claim 1, further comprising:
initiating a download; and
if the web browser is in the full screen mode, exiting the full screen mode of the web browser in response to the initiating of the download and displaying the web page in the standard mode.

4. The method of claim 1, further comprising:
executing a script in the web page; and
if the web browser is in the full screen mode, exiting the full screen mode of the web browser in response to the executing of the script and displaying the web page in the standard mode.

5. The method of claim 1, further comprising:
opening at least one additional window; and
if the web browser is in the full screen mode, exiting the full screen mode of the web browser in response to the opening of the at least one additional window and displaying the web page in the standard mode.

6. The method of claim 1, further comprising:
navigating to a uniform resource locator (URL) different from a current URL; and
if the web browser is in the full screen mode, exiting the full screen mode of the web browser in response to the navigating and displaying the web page in the standard mode.

7. The method of claim 1, wherein the initial interaction comprises a selection of the at least one form element.

8. The method of claim 1, wherein the initial interaction comprises a received text input to the at least one form element.

9. The method of claim 1, wherein the initial interaction comprises a user interaction associated with a first form element of the at least one form element, and wherein the subsequent interaction comprises a user interaction associated with a second form element of the at least one form element.

10. The method of claim 1, wherein the initial interaction comprises a first user interaction associated with one of the at least one form element, and wherein the subsequent interaction comprises a second user interaction associated with the one of the at least one form element.

11. A system, comprising:
one or more processors; and
a non-transitory computer-readable medium comprising instructions stored therein, which when executed by the one or more processors, cause the one or more processors to perform operations comprising:
providing for display a web page in a full screen mode of a web browser, wherein an address bar configured to display a universal resource locator (URL) of the web page is hidden when the web browser is in the full screen mode, the address bar is displayed when the web browser is in a standard mode, and wherein the web page comprises at least one form element; and
determining validity of an authentication certificate associated with the web page;
if the authentication certificate is invalid, exiting the full screen mode and displaying the web page in the standard mode of the web browser;
detecting an initial interaction associated with the at least one form element;
in response to detecting the initial interaction, exiting the full screen mode of the web browser if the web browser is in the full screen mode and displaying the web page in the standard mode of the web browser; and receiving a subsequent interaction associated with the at least one form element in the standard mode of the web browser.

12. The system of claim 11, wherein the instructions, when executed by the one or more processors, cause the one or more processors to perform operations further comprising:
    comparing a uniform resource locator (URL) of the web page to URLs in a database; and
    if the web browser is in the full screen mode, exiting the full screen mode of the web browser in response to a match between the URL of the web page and one of the URLs in the database and displaying the web page in the standard mode.

13. The system of claim 11, wherein the instructions, when executed by the one or more processors, cause the one or more processors to perform operations further comprising:
    initiating a download; and
    if the web browser is in the full screen mode, exiting the full screen mode of the web browser in response to the initiating of the download and displaying the web page in the standard mode.

14. The system of claim 11, wherein the instructions, when executed by the one or more processors, cause the one or more processors to perform operations further comprising:
    executing a script in the web page; and
    if the web browser is in the full screen mode, exiting the full screen mode of the web browser in response to the executing of the script and displaying the web page in the standard mode.

15. The system of claim 11, wherein the instructions, when executed by the one or more processors, cause the one or more processors to perform operations further comprising:
    opening at least one additional window by the web browser; and
    if the web browser is in the full screen mode, exiting the full screen mode of the web browser in response to the opening of the at least one additional window and displaying the web page in the standard mode.

16. The system of claim 11, wherein the instructions, when executed by the one or more processors, cause the one or more processors to perform operations further comprising:
    navigating to a uniform resource locator (URL) different from a current URL; and
    if the web browser is in the full screen mode, exiting the full screen mode of the web browser in response to the navigating and displaying the web page in the standard mode.

17. The system of claim 11, wherein the initial interaction comprises one of a selection of the at least one form element or a received user input to the at least one form element.

18. The system of claim 11, wherein:
    a status bar configured to display information associated with the web page is hidden when the web browser is in the full screen mode, and
    the entering of the standard mode further comprises displaying the status bar.

19. A non-transitory machine-readable medium comprising instructions stored therein, which when executed by a machine, cause the machine to perform operations comprising:
    detecting a predefined action in a web browser;
    providing for display a web page in a full screen mode of the web browser in response to detecting the predefined action, wherein the web page comprises at least one form element, an address bar configured to display a universal resource locator (URL) of the web page is hidden when the web browser is in the full screen mode and the address bar is displayed when the web browser is in a standard mode;
    determining validity of an authentication certificate associated with the web page;
    if the authentication certificate is invalid, exiting the full screen mode and displaying the web page in the standard mode;
    detecting an initial interaction associated with the at least one form element;
    in response to detecting the initial interaction, exiting the full screen mode of the web browser if the web browser is in the full screen mode and displaying the web page in the standard mode of the web browser; and
    receiving a subsequent interaction associated with the at least one form element in the standard mode of the web browser.

20. The non-transitory machine-readable medium of claim 19, wherein the instructions, when executed by the machine, cause the machine to perform operations further comprising:
    detecting a browser-initiated content-based event; and
    if the web browser is in the full screen mode, exiting the full screen mode of the web browser in response to detecting the browser-initiated content-based event and displaying the web page in the standard mode.

* * * * *